Dec. 7, 1971  E. J. ALDRED  3,624,988
LAWNMOWERS

Filed March 11, 1970  11 Sheets-Sheet 1

FIG. 1

INVENTOR
Edward John Aldred
BY
ATTORNEY

Dec. 7, 1971  E. J. ALDRED  3,624,988
LAWNMOWERS

Filed March 11, 1970  11 Sheets-Sheet 5

INVENTOR
Edward John Aldred
BY
ATTORNEY

FIG. 13.

United States Patent Office 3,624,988
Patented Dec. 7, 1971

3,624,988
LAWN MOWERS
Edward John Aldred, Ipswich, England, assignor to Ransomes Sims & Jefferies Limited, Ipswich, England
Filed Mar. 11, 1970, Ser. No. 18,681
Claims priority, application Great Britain, Mar. 14, 1969, 13,494/69
Int. Cl. A01d 75/30
U.S. Cl. 56—7
19 Claims

ABSTRACT OF THE DISCLOSURE

A lawn mower has a cutting unit supported on forward and rear ground-engaging members, and a cutting unit connected to the frame by a pair of laterally spaced connecting members and by a third connecting member vertically spaced from the pair of connecting members. The cutting unit is supported by a single ground-engaging member mounted on the unit rearwardly of its bottom blade and by the three connecting members, which allow the unit to move bodily upwards and downwards relative to the frame and to tilt about any axis parallel to the direction of travel of the frame. A number of cutting units may be mounted on one frame.

---

This invention relates to lawn mowers, and more particularly to lawn mowers suitable for use on putting greens of golf courses.

It is desirable that the height of cut of such a lawn mower should be as nearly uniform as possible over the area of the green, and that this height should not be unduly affected by undulations or changes in slope of the ground or by variations in the density or toughness of the grass to be cut.

Such lawn mowers are known which are of the kind comprising a frame supported on forward and rear ground-engaging supporting members and a cutting unit connected to the frame and having a cutting cylinder which co-operates with a bottom cutting blade, the connection between the cutting unit and the frame allowing the cutting unit to tilt relatively to the frame about any axis parallel to the direction of travel of the lawn mower.

A lawn mower of the kind set forth has been proposed in which the frame comprises two frame parts pivotally connected together to permit relative tilting of the elements about a longitudinal axis, the frame parts respectively carrying the forward and rear ground-engaging supporting elements, and in which the cutting unit is supported by forward and rear ground-engaging members disposed respectively in front of and behind the bottom cutting blade.

A lawn mower constructed in this manner has disadvantages due to the supporting of the cutting unit on forward and rear ground-engaging members. For example, when the lawn mower in operation encounters an area of denser or tougher grass, the forward ground-engaging member will tend to ride up over the tougher or denser grass so that it will not be cut as close to the ground as will the adjacent area of grass. This effect will be particularly marked since the cutting unit does not support the weight of a grass box or motor and so is comparatively light. On a second or subsequent run over the same area, riding up will again occur, and the difference in height of cut between the area of denser or tougher grass and the adjacent area will become relatively greater.

It is an object of the present invention to provide an improved lawn mower of the kind set forth which largely if not wholly overcomes these disadvantages.

According to this invention there is provided a lawn mower of the kind set forth in which the cutting unit is supported by a single ground-engaging member, which member is disposed rearwardly of the bottom cutting blade, and by the connection between the cutting unit and the frame, which connection comprises a pair of laterally spaced rigid connecting members pivotally connected to the cutting unit and to the frame, and a third rigid connecting member vertically spaced from the pair of rigid connecting members and pivotally connected to the cutting unit and to the frame, the connection allowing the cutting unit to move relatively to the frame bodily upwards and downwards as well as to tilt relatively to the frame about any axis parallel to the direction of travel of the lawn mower.

Preferably, the pair of rigid connecting members are symmetrically disposed with respect to the cutting unit, and the third connecting member is pivotally connected to the cutting unit and the frame at a point in or near the vertical plane containing the longitudinal axis of the lawn mower. Advantageously, each rigid connecting member is pivotally connected to the cutting unit at a point in or near the vertical plane containing the axis of the cutting cylinder.

Preferably, the rigid connecting members are rods and the lower rod or pair of rods is connected to the frame by a bush bearing or bearings on the spindle of a roller forming the forward ground-engaging member of the frame, the rods being otherwise connected to the frame and cutting unit by ball and socket joints.

The lawn mower may comprise a plurality of similar cutting units connected to a single frame, each cutting unit being disposed in one of two longitudinally spaced locations on the frame, the or each cutting unit in the forwardmost location being laterally displaced with respect to the or each cutting unit in the rearmost location. In this case, advantageously, the frame comprises a main frame part, supported on the said forward and rear ground-engaging members, and forward and sub-frames each pivotally connected to the main frame part about a transversely disposed horizontal axis and each having a further ground-engaging member forwards of the said axis, each cutting unit being connected to one of the sub-frames and positioned between the ground-engaging member of the sub-frame and the axis of pivotal connection of the sub-frame to the main frame part.

Several embodiments of the invention will now be described, by way of example, with reference to the accompanying drawings, in which:

FIG. 7 is a section taken on line VII—VII of FIG. 3, FIGS. 8 and 9 are respectively a somewhat diagrammatic plan view and side elevation of the cutting unit and front roller of a second embodiment of the invention.

Throughout the drawings, like parts have been given the same reference numerals.

Referring to the drawings, a lawn mower suitable for use on putting greens of golf courses includes a rigid frame 2 comprising two longitudinally extending side members 4 each secured at its forward end to a frame member 6. The side members 4 are rigidly connected together by transverse members 10 (FIGS. 1 and 2) which also support an internal combustion engine 14, fuel tank 16 and gear box 17. A ground-engaging front roller 18 of length slightly less than the width of cut of the machine is rotatably mounted on a spindle (not shown) fixed between the frame members 6.

Figure 1:
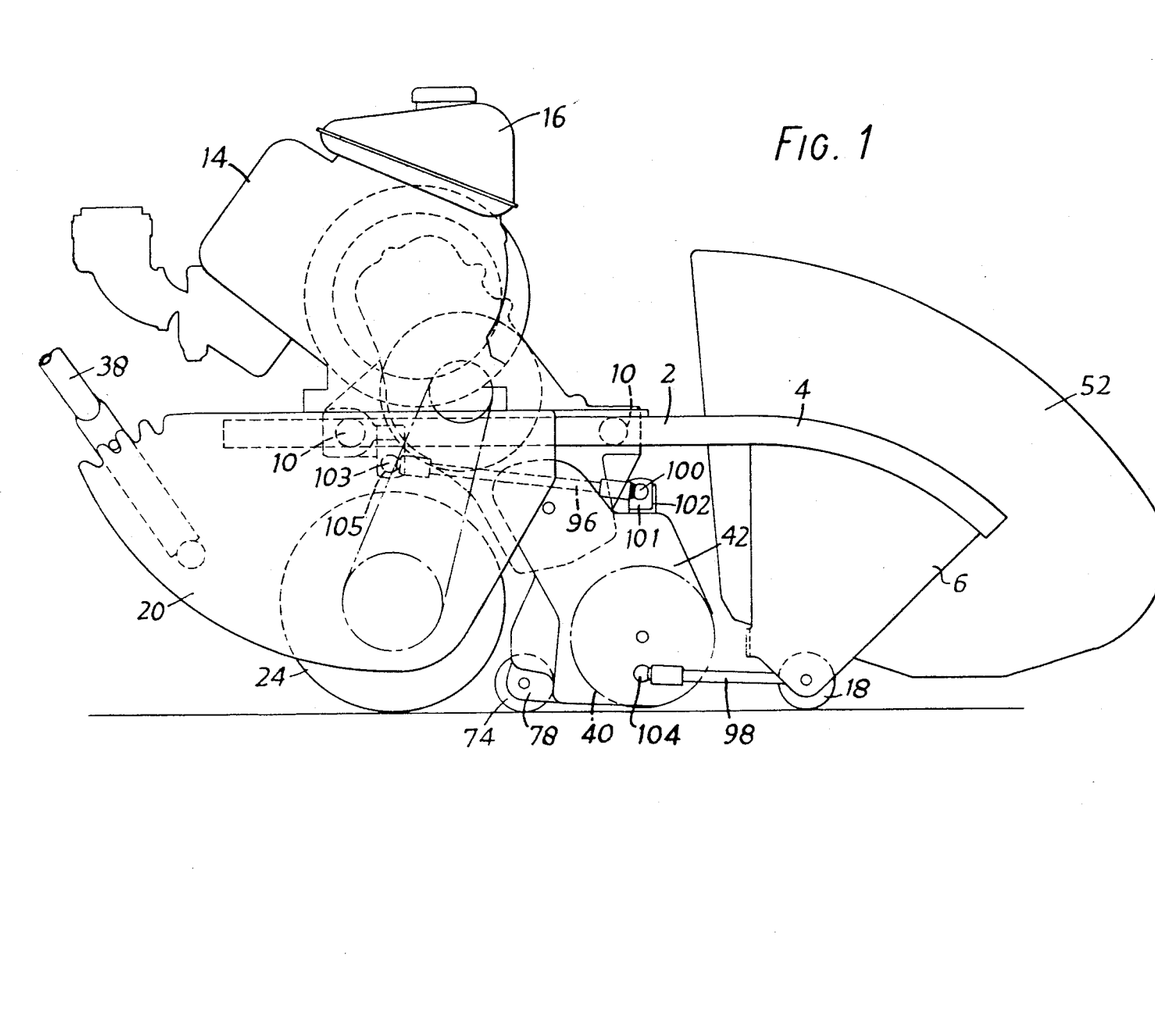
FIG. 1 is a somewhat diagrammatic side elevation of a lawn mower constructed according to the invention.
Figure 2:
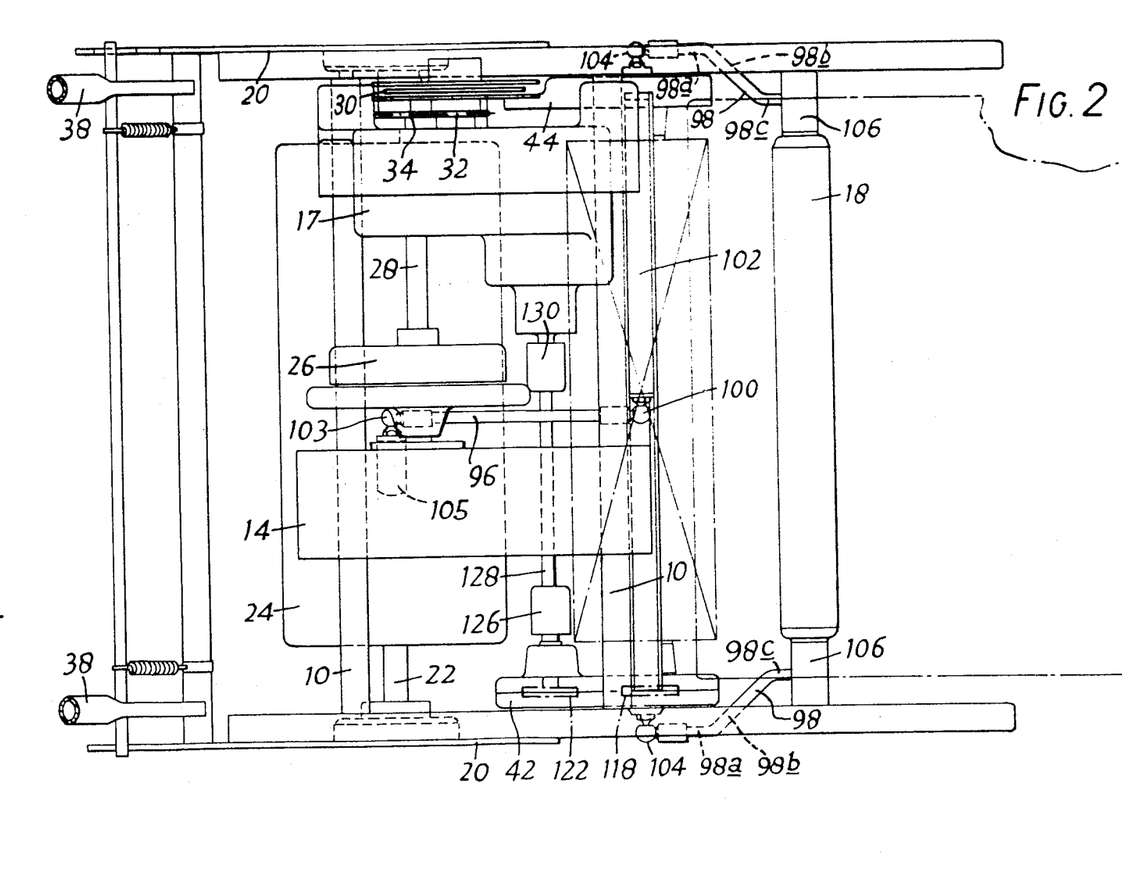
FIG. 2 is a top plan view of part of the lawn mower of FIG. 1.

Towards the rear of the frame 2 and rigidly fixed to the side members 4 thereof are respective side plates 20. The side plates 20 are each of generally triangular form with the base uppermost, and journalled in the side plates is an axle 22 carrying a large diameter land-roll 24. The land-roll 24 comprises two co-axial cylindrical parts (not shown) each extending about half the width of the lawn mower and is driven by the axle 22 through a differential gear (not shown) of known form disposed centrally inside the land-roll. The axle 22 is driven by the engine 14 by way of centrifugal clutch 26, crankshaft 28, reduction gearing in gear box 17, manually operated friction plate clutch 30 and sprocket 32 connected by a chain drive to driven sprocket 34 on the land-roll axle 22.

The land-roll 24 is rubber-covered so that the lawn mower can be more easily moved from green to green on the land-roll without special transport wheels having to be fitted.

The side plates 20 also serve to support the guiding handle 38, which extends upwardly and rearwardly from the rear of the frame 2 and is pivotally mounted between the side plates 20.

Figure 3:
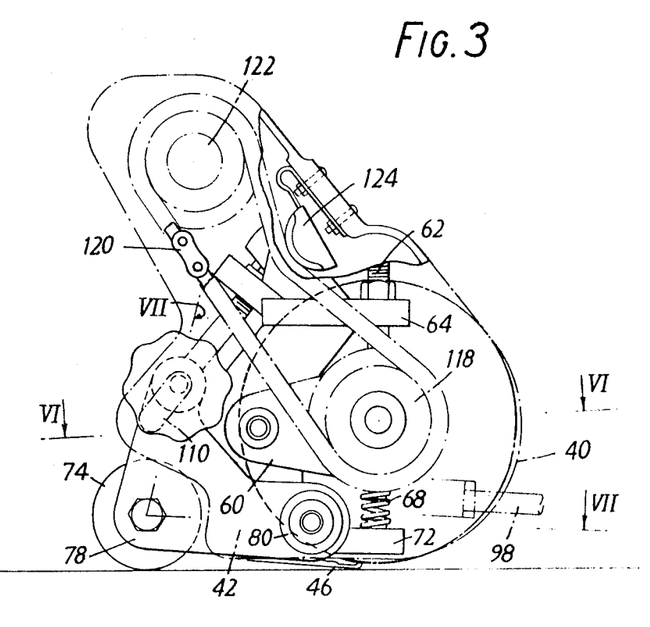
FIG. 3 is a side elevation of the cutting unit of the lawn mower of FIGS. 1 and 2, looking from the right of FIG. 2.
Figure 4:
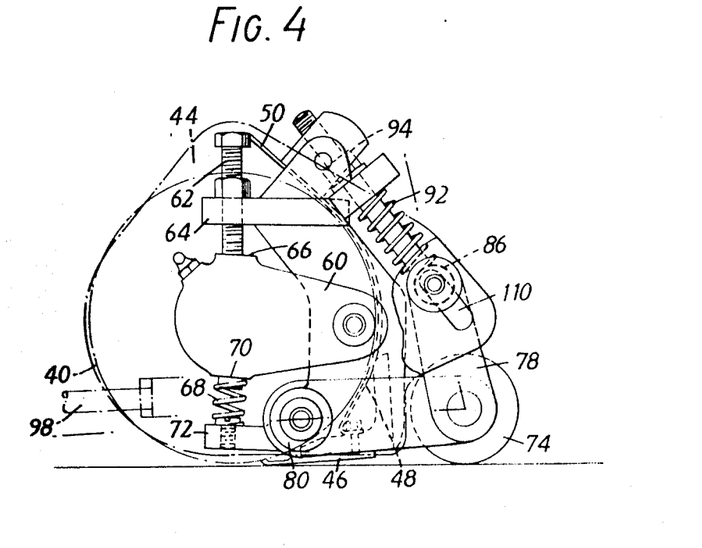
FIG. 4 is a side elevation of the cutting unit of FIG. 3, looking from the left of FIG. 2.
Figure 5:
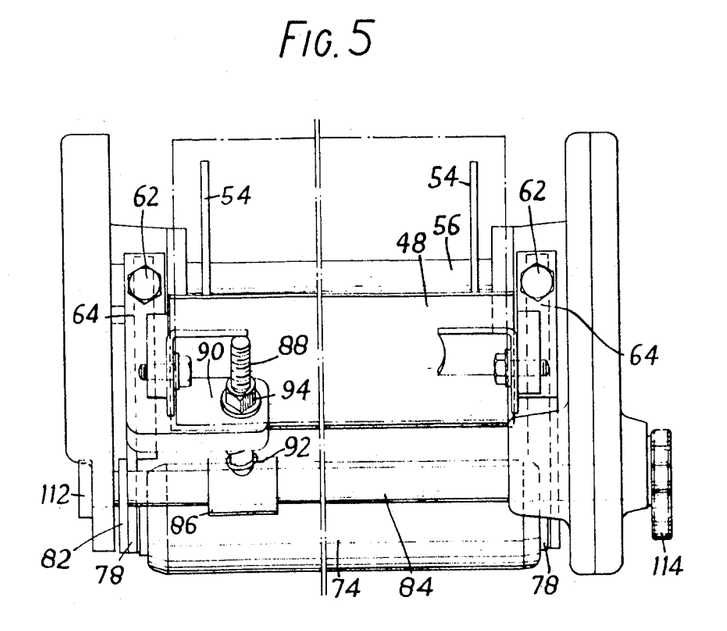
FIG. 5 is a top plan view of the cutting unit of FIGS. 3 and 4.

The cutting unit includes a cutting cylinder 40 mounted between two side plates 42 and 44. Rigidly attached to the side plates 42 and 44 are a bottom blade 46 and a part-cylindrical back plate 48 disposed rearwardly of the cutting cylinder 40. The upper part 50 of the back plate 48 is upwardly and forwardly inclined so that, in operation of the lawn mower, grass cuttings are thrown forwardly into a grass-box 52 detachably mounted on the frame forwardly of the cutting unit. The cutting cylinder 40 is of conventional form and comprises a number of helically extending blades (not shown) fixed by a number of spaced plates 54 to a substantially horizontally disposed shaft 56. The ends of the shaft 56 are journalled in bearings 58 carried by short lever plates 60 pivotally connected at points rearward of the shaft 56 to the side plates 42 and 44 respectively of the cutting unit, so that the separation between the cylinder 40 and the bottom blade 46 can be adjusted. The adjustment is carried out by means of screws 62, each of which threadedly engages an inwardly extending part 64 of one of the side plates 42 and 44 and bears onto the upper surface 66 of the adjacent short lever plate 60 directly above the shaft 56. Each lever plate 60 is maintained in contact with the associated screw 62 by means of a helical compression spring 68 acting between the lower-surface 70 of the lever plate 60 and an abutment 72 formed on the corresponding side plate 42 or 44.

The rear end of the cutting unit is supported by a freely rotatable ground engaging roller 74. The ends of the roller 74 are carried in bearings 76 mounted on two generally L-shaped members 78. The lower arm of each L-shaped member extends forwardly and is pivotally connected at its end 80 to the adjacent side plate 42 or 44 of the cutting unit.

The upwardly extending arms 82 of the L-shaped members 78 carry at their upper ends a horizontal tubular shaft 84 which extends between the side plates 42 and 44. The shaft 84 passes through the head 86 of an eye-bolt, the threaded shank 88 of which extends upwardly and substantially perpendicularly to the plane containing the axis of shaft 84 and the points of connection of the lower arms of the L-shaped members 78 and the side plates 42 and 44, and passes loosely through a hole in an upwardly extending lug 90 on the side plate 44. A helical compression spring 92 surrounding the shank 88 between the head 86 of the eye-bolt and the lower surface of the lug 90 urges the shaft 84 downwards and the position of the shaft is maintained by an adjusting nut 94 threaded on the shank 88 and engaging the upper surface of the lug 90. By means of the adjusting nut 94 the position of the roller 74 relative to the cutting unit can be adjusted, the L-shaped members 78 pivoting about their connections to the side plates 42 and 44, thus varying, in operation, the height of the bottom blade 46 above the ground and so adjusting the height of cut of the lawnmower. A rod 108 disposed within the tubular shaft 84 extends at its ends through inclined slots 110 in the side plates 42 and 44. Secured to one end of the rod 108 is a friction plate 112 which bears against the outer surface of side plate 44, and threadedly engaging the other end of the rod 108 is a clamping member 114 which bears against the outer surface of side plate 42. When the height of cut has been adjusted by means of the adjusting nut 94, clamping member 114 is tightened to clamp the shaft 84 in position relative to side plates 42 and 44 to ensure that the height of cut remains constant.

The cutting unit is connected to the frame 2 by means of an upper tie rod 96 disposed in the vertical plane containing the longitudinal axis of the lawn mower and a pair of lower tie rods 98 disposed one at each side of the cutting unit. The upper tie rod 96 extends rearwardly and slightly upwardly from a point on the cutting unit substantially vertically above the axis of the cutting cylinder 40 to a point on the frame 2 substantially vertically above the axis of the land-roll 24. At its forward end the tie rod 96 is connected by a ball and socket joint 100 to an upright plate 101 fixed to a transversely extending bar 102 bolted at its ends to the side plates 42 and 44 of the cutting unit. At its rar end the rod 96 is connected by a ball and socket joint 103 to a bracket 105 secured to the frame of the lawn mower.

Each lower tie rod 98 extends generally forwardly and slightly downwardly from the cutting unit, and comprises a rear forwardly extending portion 98a, an inwardly and forwardly extending intermediate portion 98b, and a front portion 98c, extending forwardly from the intermediate portion. The rearward end of each tie rod 98 is connected to the adjacent side plate 42 or 44 of the cutting unit by a ball and socket joint 104 positioned on the outer face of the side plate 42 or 44 vertically below the axis of the cutting cylinder 40. The forward end of each tie rod 98 is connected to a sleeve 106 surrounding the spindle of the ground engaging front roller 18 of the frame 2 between the frame and the roller 18 so that the rearward end of the rod 98 is constrained to move substantially in a vertical plane. This ensures that, in operation, the cutting unit follows the path of the lawn mower without sideward movement of the cutting unit.

Each of the rods 96 and 98 is joined to the socket member of its associated ball and socket joint or joints by way of a sleeve formed in one with the socket member and threadedly engaging the end of the rod, so that the rod is adjustable in length.

It will be appreciated that the connection between the cutting unit and frame 2 allows the cutting unit to move bodily upwards and downwards relatively to the frame and, by differential movement of the sides of the cutting unit, to tilt about any longitudinal axis of the frame.

To take up the small change in the horizontal separation of the ball joints 104 of the lower tie rods 98 when the cutting unit is tilted, a slight play is allowed between the sleeves 106 of the lower tie rods 98 and the spindle of the front roller 18 of the frame.

Figure 6:
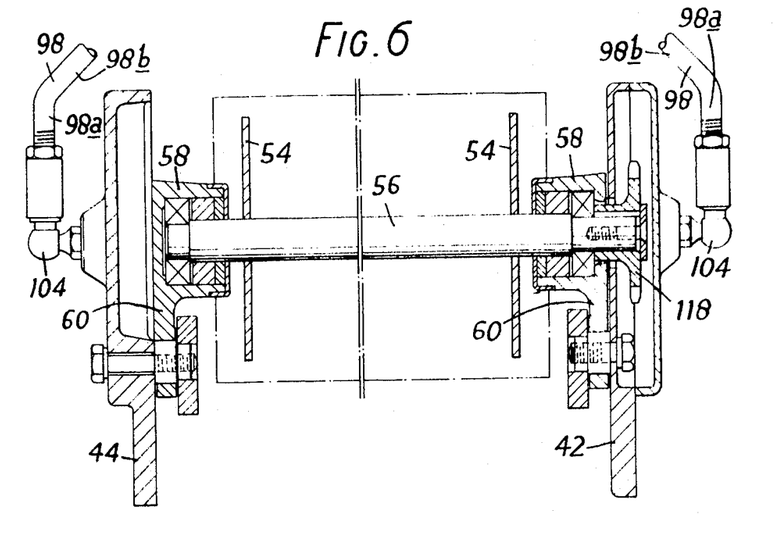
FIG. 6 is a section taken on line VI—VI of FIG. 3.
Figure 7:
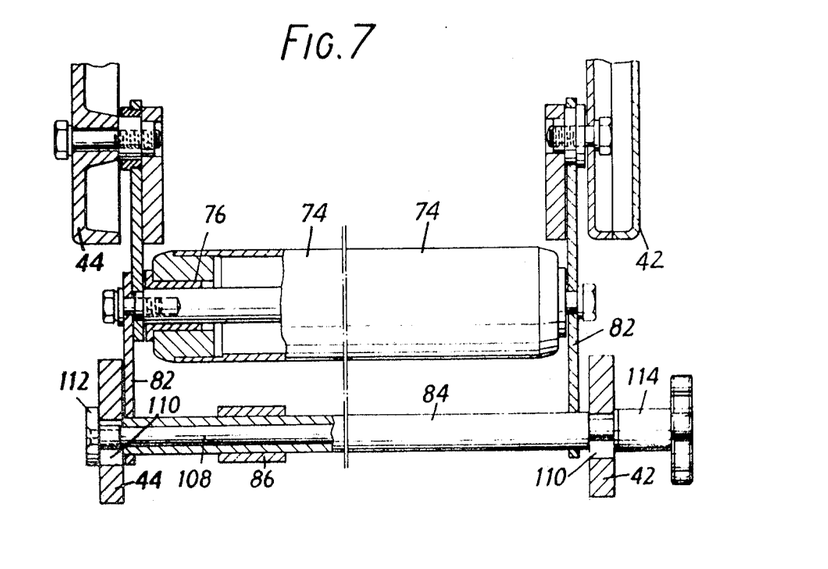

At one end of the shaft 56 of the cutting cylinder 40 and fixed thereto is a sprocket 118 which is connected by an endless roller chain 120 to a further sprocket 122 rotatably mounted on an upper part of the adjacent side plate 42 of the cutting unit. A spring-biased jockey 124 is provided on the side plate 42 to take up any slackness in the chain due to adjustment of the position of the cutting cylinder 40 relative to the side plate 42. The further sprocket 122 is connected through a universal joint 126 to one end of a transverse shaft 128 the other end of which is connected through a universal joint 130 to an output shaft from the gear box 17. This output shaft is driven from the motor output shaft 28 through a chain drive and manually operated clutch (not shown). Thus, in operation, the cutting cylinder 40 is driven by the engine 14 through a drive which allows movement of the cutting unit relative to the frame 2.

In order to compensate for the imbalance of the cutting unit introduced by the driving connection from the engine 14 to the cutting cylinder 40, there is provided a counterweight (not shown) slidably mounted on the horizontal shaft 84. A screw threadedly engaging a hole in the counterweight and bearing onto the shaft 84 enables the counterweight to be fixed in position on the shaft when this position has been adjusted so that the cutting unit is correctly balanced.

FIGS. 8 and 9 and FIGS. 10 and 11 show alternative arrangements of the linkage between the cutting unit and frame of the lawn mower.

Figure 8:
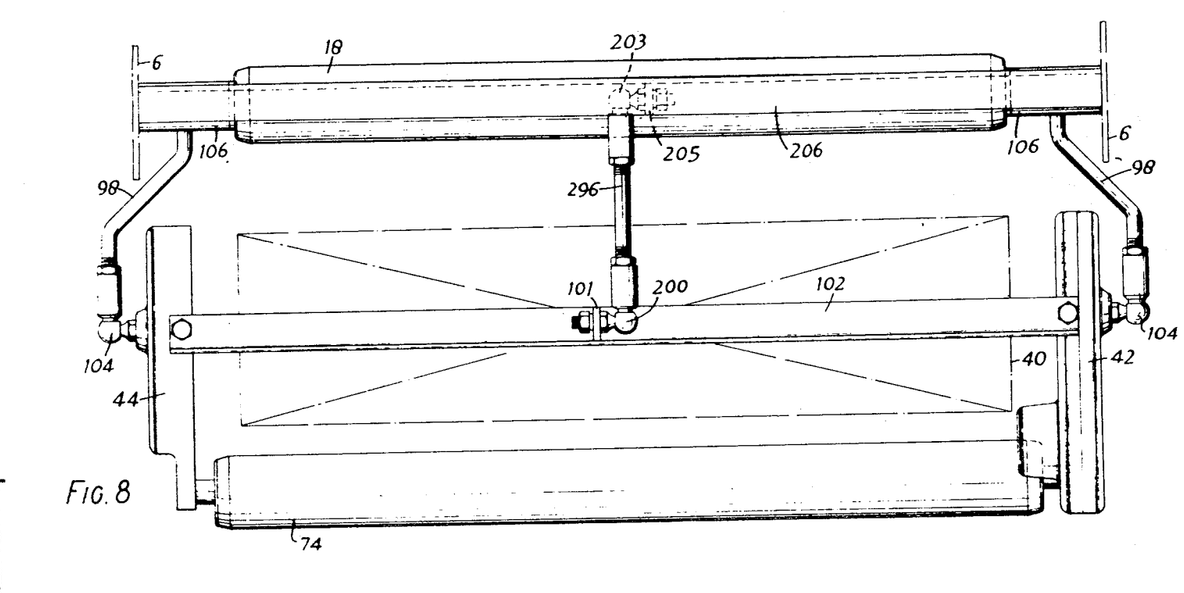
Figure 9:
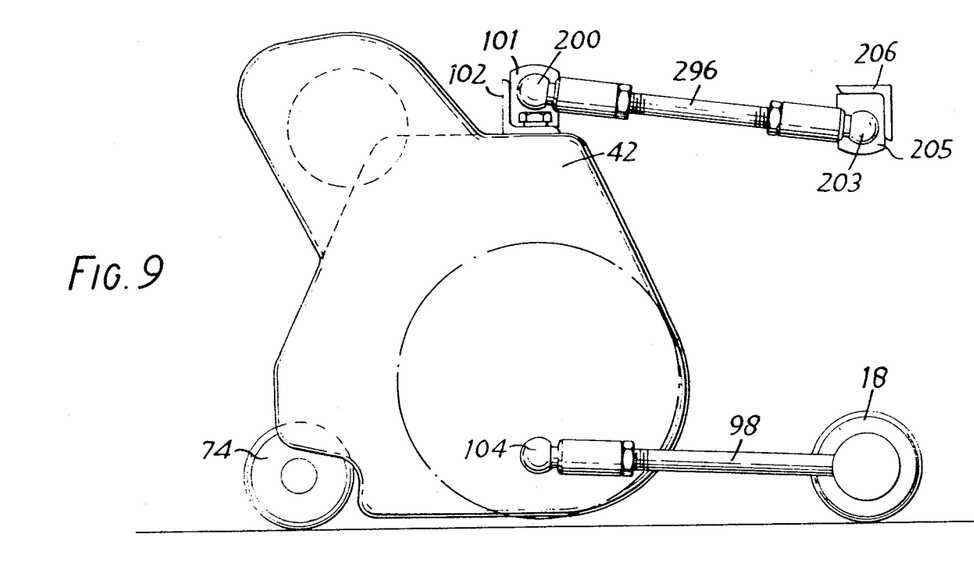

In the arrangement of FIGS. 8 and 9, the cutting unit is connected to the frame 2 by means of two lower tie-rods 98 arranged as in the first embodiment, and an upper tie-rod 296 extending forwardly and slightly downwardly from a point on the cutting unit vertically above the axis of the cutting cylinder 40 to a point on the frame vertically above the axis of the front roller 18. At its rear end the tie rod 296 is connected by a ball and socket joint 200 to upright plate 101 fixed to the transversely extending bar 102 bolted at its ends to side plates 42 and 44 of the cutting unit. At its forward end the rod 296 is connected by a ball and socket joint 203 to an upright plate 205 fixed to a transversely extending bar 206 secured at its ends to the frame members 6.

Figure 10:
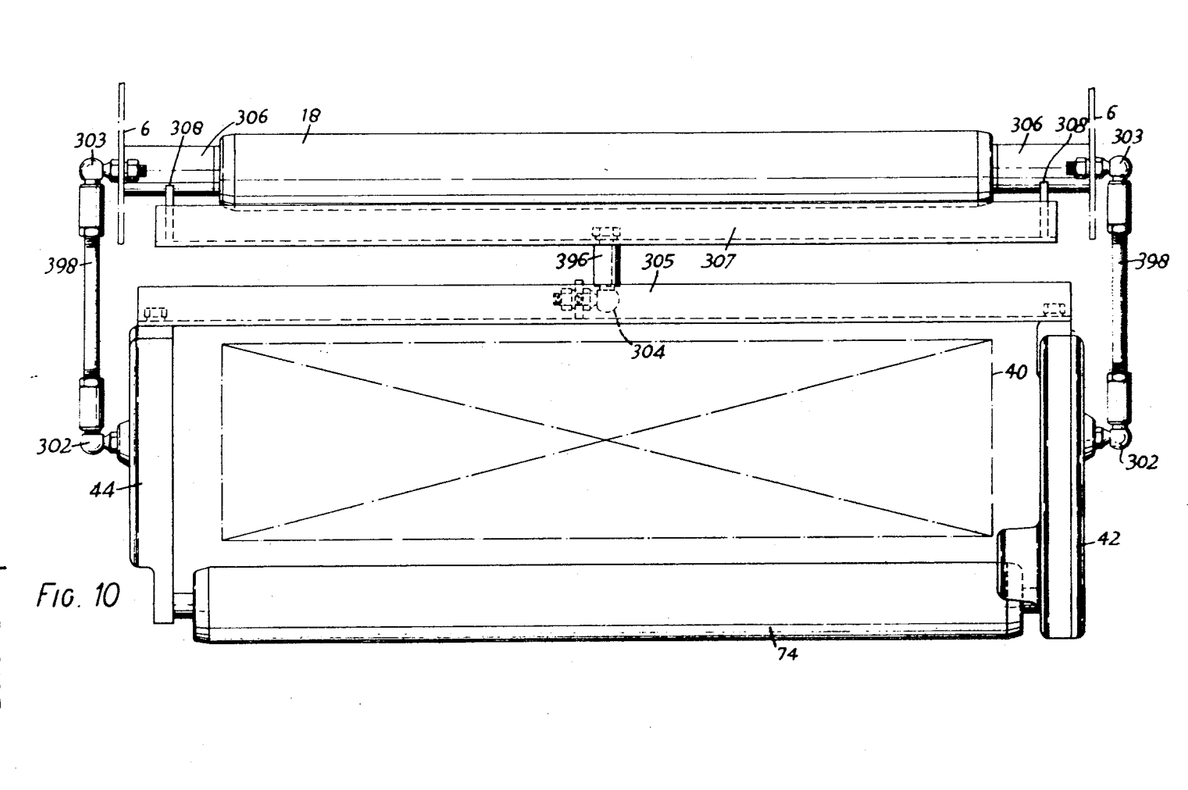
FIGS. 10 and 11 are respectively a somewhat diagrammatic plan view and side elevation of the cutting unit and front roller of a third embodiment of the invention.
Figure 11:
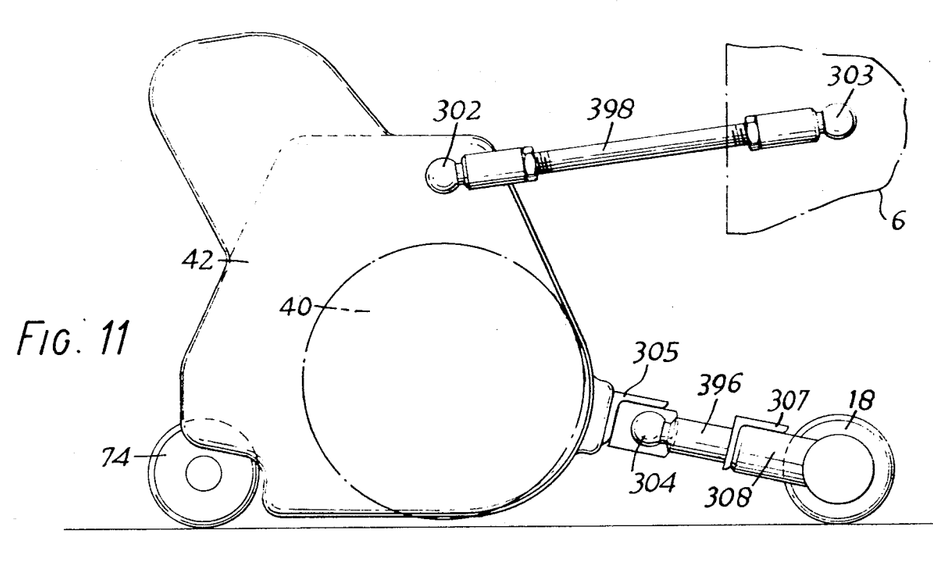

In the arrangement shown in FIGS. 10 and 11, the cutting unit is connected to the frame 2 by means of a lower tie rod 396 and a pair of upper tie rods 398 disposed one at each end of the cutting unit. Each upper tie rod 398 extends forwardly and slightly upwardly from a point on the cutting unit vertically above the axis of the cutting cylinder 40 to a point on the frame vertically above the axis of the front roller 18. Each rod 398 is connected at its forward end by a ball joint 303 to one of the frame members 6, and at its rear end by a ball joint 302 to one of the side plates 42 and 44 of the cutting unit.

The lower tie-rod 396 is connected at its rear end through a ball joint 304 to the mid point of a transversely extending bar 305 rigidly bolted at its ends to the side plates 42 and 44 of the cutting unit. At its forward end tie rod 396 is rigidly bolted to the mid-point of a transversely extending bar 307. Secured to the bar 307 near each of its ends is a forwardly extending plate 308 welded at its forward end to a sleeve 306 surrounding the spindle of front roller 18. The tie rod 396 is therefore constrained to move in a vertical plane, so that, as in the previous embodiments, the cutting unit is, in operation, constrained to follow the path of the lawn-mower without sideward movement.

Figure 12:
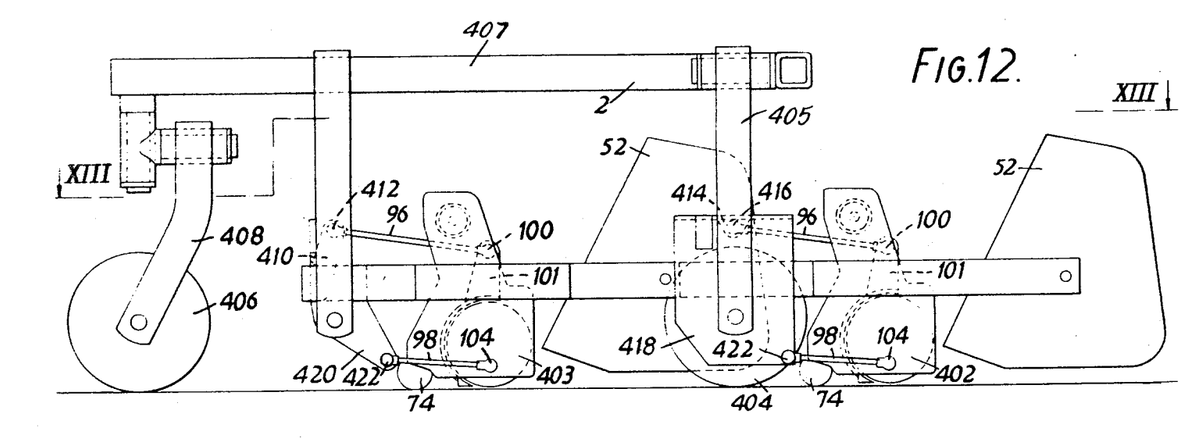
FIG. 12 is a somewhat diagrammatic side elevation of the frame and cutting units of a fourth embodiment of the invention.
Figure 13:
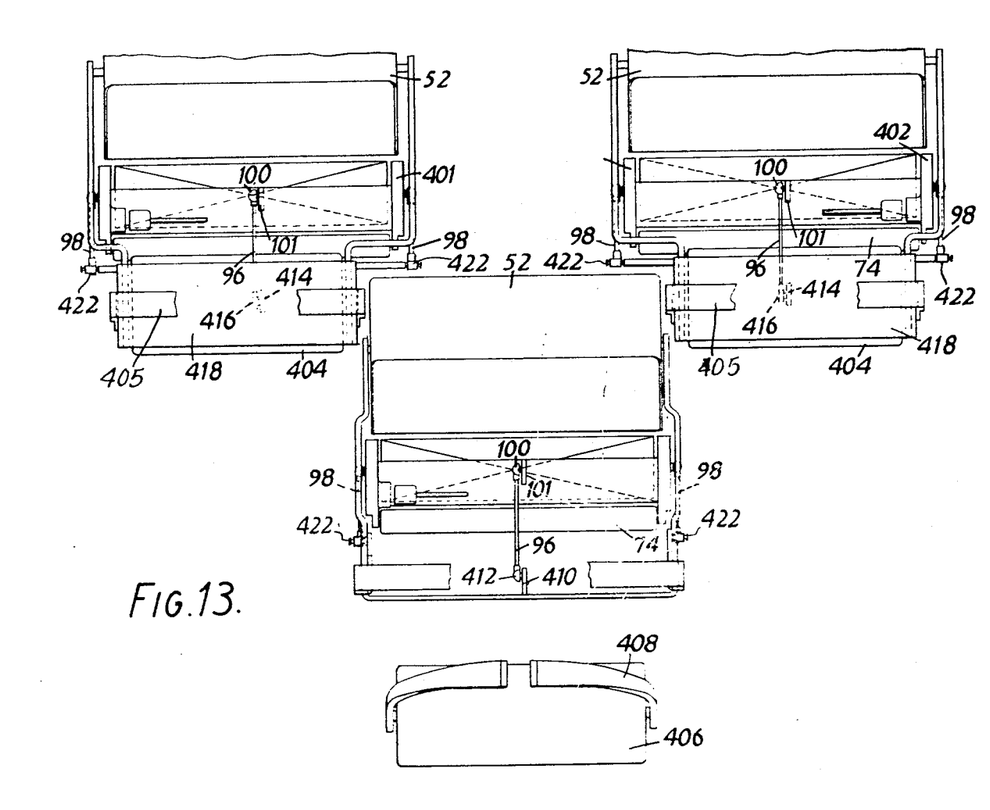
FIG. 13 is a cross-section on line XIII—XIII of FIG. 12.
Figure 14:
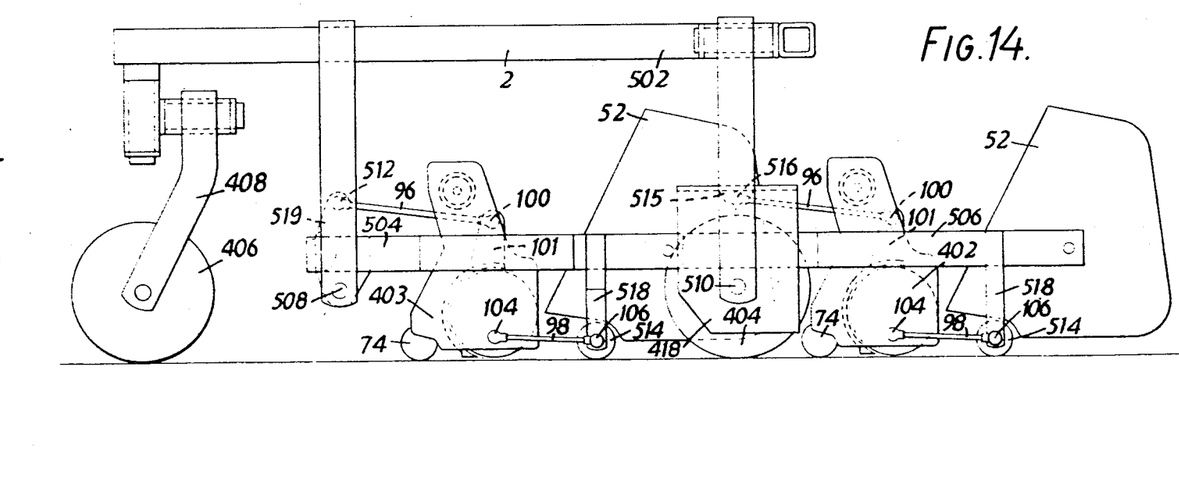
FIG. 14 is a somewhat diagrammatic side elevation of the frame and cutting units of a fifth embodiment of the invention.

In each of the two embodiments of the invention shown in FIGS. 12 to 14, a single frame 2 carries three cutting units. As shown in FIG. 13, two cutting units 401 and 402 are mounted co-axially at a forward location of the frame 2, whilst the third cutting unit 403 is mounted at a location rearwards of the other cutting units and is positioned so as, in operation, to cut the swath of grass between the swaths cut by the two forwardmost cutting units 401 and 402. The frame 2 is supported on two co-axially arranged front rollers 404, and a rear roller 406. Each front roller 404 is carried by a yoke member 405 forming part of the frame 2 and pivotally connected for rotation about a horizontally disposed longitudinal axis to a rigid upper member 407 of the frame 2. The rear roller 406 is carried by a fork 408 mounted on the upper member 407 of the frame for rotation about a horizontally disposed longitudinal axis and about a vertical axis, and is manually steerable by means of a suitable steering handle (not shown). The pivotal connection of each yoke member 405 and the fork 408 to the frame member 407 enables each roller 404, 406 to maintain contact with the ground when the lawn-mower is traversing an uneven surface.

In the embodiment shown in FIGS. 12 and 13, each cutting unit is connected to the frame 2 by means of an upper tie rod 96 disposed in the vertical plane containing the longitudinal axis of the lawn mower and a pair of lower tie rods 98 disposed one at each side of the cutting unit. The upper tie rod 96 of each cutting unit extends rearwardly and upwardly from a point on the cutting unit substantially vertically above the axis of the cutting cylinder to a point of the frame 2. The forward end of each tie rod 96 is connected by a ball and socket joint 100 to an upright plate 101 fixed to the cutting unit. The rear end of tie-rod 96 of the rear cutting unit 403 is connected by a ball and socket joint 412 to a plate 410 fixed rigidly to the frame 2. The rear end of tie-rod 96 of each front cutting unit 402 or 403 is connected by a ball and socket joint 416 to a bracket 414 fixed to the fork member 418 supporting roller 404, the fork member 418 being rigidly fixed to the main part of the frame 2.

Each lower tie-rod 98 of each of the cutting units extends rearwardly and upwardly from a point on the cutting unit vertically below the axis of the cutting cylinder to a point on the frame 2, the vertical spacing between the rear ends of the upper and lower tie-rods 96 and 98 being greater than the vertical spacing between their forward ends. Each lower tie-rod 98 is connected by a ball joint 104 at its forward end to a side plate of the cutting unit and at its rear end by a bush bearing 422 to a plate 420 rigidly fixed to the frame, in the case of the rear cutting unit 403 and to the fork member 418 in the case of each of the front cutting units 401 and 402.

In front of each of the cutting units 401, 402 and 403 there is mounted on a frame 2 a grass-box 52 positioned to receive grass cuttings from the associated cuttting unit.

In the embodiment shown in FIG. 14, the frame 2 consists of a main frame part 502 and a rearmost sub-frame 504 and two forwardmost sub-frames 506. Sub-frame 504 is pivotally connected to the main frame part about a transversely disposed horizontal axis 508, whilst each sub-frame 506 includes the fork member 418, which in this case is not fixed to the main frame part but can pivot about the axis 510 of the roller 404. Each of the sub-frames 504 and 506 is supported at its forward end on a roller 514, carried between upright members 518 of the sub-frame.

Each of the cutting units 401, 402 and 403 is connected to one of the sub-frames 504 or 506 by means of an upper tie-rod 96 disposed in the vertical plane containing the longitudinal axis of the cutting unit and two lower tie-rods 98 disposed one at each side of the cutting unit. The upper tie-rod 96 of the rear cutting unit 403 is connected by a ball and socket joint 100 to the cutting unit and extends rearwardly and upwardly to a point on plate 519 fixed to the sub-frame, to which plate the tie-rod is connected by a ball and socket joint 512. The upper tie-rod of each of the forwardmost cutting units extends rearwardly and upwardly from ball and socket joint 100 on the cutting unit to a ball and socket joint 516 connecting the tie-rod to bracket 515 on the fork member 418. Each lower tie-rod 98 of each cutting unit is connected by a ball and socket joint 104 to the adjacent sideplate of the cutting unit at a point vertically below the axis of the cutting cylinder, and extends forwardly and downwardly to a bush-bearing 106 on the spindle carrying the roller 514. It will be apparent that, in this embodiment, the pivoting of the sub-frames to the main frame allows them to follow the contours of the ground traversed by the lawn-mower, the front roller 514 of each sub-frame remaining always in contact with the ground. In addition, each cutting unit, which is positioned between the roller 514 of a sub-frame and its point of pivotal connection to the main frame part, can move bodily upwardly and downwardly relative to the sub-frame, and can tilt about any longitudinal axis relative to the sub-frame.

In the embodiment of FIG. 14, each of the three grassboxes 52 is fixed to the associated sub-frame part in such a manner that it is positioned in front of one of the cutting units to receive grass cuttings from that cutting unit.

It will be appreciated that, in the embodiments of FIGS. 12 to 14, a motor (not shown) is carried on the frame 2 and suitable flexible driving connections are made to one or more of the land-rolls 404 and 406 and to the cutting cylinder of each cutting unit. For example hydraulic driving connections could be used, the motor driving a pump supplying fluid through flexible hoses to a hydraulic motor carried at one side of each cutting unit. The frame 2 could also be provided with a seat for the operator of the lawn mower.

In operation of the lawn mower of any of the described embodiments, on level ground, the or each cutting unit supported above the ground by its ground-engaging roller 74 and by the tie rods connecting it to the frame 2, is moved over the ground with the bottom cutting blade 46 at a previously adjusted height from the ground. On moving over undulations in the ground disposed transversely to the line of travel of the lawn mower, or longitudinally thereof, the distance from the ground of various parts of the frame 2 will vary as they will on moving from level to sloping ground or vice versa. Because of the form of connection of the or each cutting unit to the frame 2 and of the supporting of the cutting unit by a single ground-engaging roller 74 at the rear of the cutting cylinder 40, the cutting unit will tend to move relatively to the frame 2 so as to compensate for the change in distance from the ground of the various parts of the frame. Thus, the height of the cut of the lawn mower is rendered substantially uniform.

On traversing ground having a slope varying in a direction transverse to the line of travel of the lawn mower, the or each cutting unit will tend to tilt relative to the frame 2 so as to reduce variation in height of cut in that direction.

On encountering an area of denser or tougher grass, the cutting unit will not tend to ride up over the grass before it is cut, as the single ground-engaging roller 74 of the cutting unit is disposed behind the cutting cylinder 40. The grass in such an area will therefore be cut to the same height as that in adjacent areas, and there will be no tendency for a difference in height of grass in the area to build up during subsequent runs over the area.

It will be appreciatged that many changes can be made in the construction of the described embodiment without departing from the scope of the invention. For example, the ground engaging roller 74 of the cutting unit could be replaced by a skid mounted between the generally L-shaped members 78. The adjustment of the position of the cutting unit roller or skid relative to the cutting unit may be made by any suitable means in place of the described mechanism.

The described driving connection between the engine and cutting cylinder could be replaced by any suitable driving connection allowing movement of the cutting unit relative to the frame.

The bush bearing or bearings at the forward end of the lower rod or rods to prevent sideways movement of the cutting unit in the embodiments of FIGS. 1 to 11 could be replaced by ball joints and, there could be provided instead a transversely disposed tie rod, pivotally connected at one end to one side of the frame and at its other end at the side of the cutting unit remote from the said one side of the frame, the tie rod preventing sideways movement of the cutting unit whilst not inhibiting its movement bodily upwards and downwards and tilting movement.

I claim:

1. A lawn mower of the kind comprising a frame supported on forward and rear ground-engaging supporting members and a cutting unit connected to the frame and having a cutting cylinder which co-operates with a bottom cutting blade, the connection between the cutting unit and the frame allowing the cutting unit to tilt relatively to the frame about any axis parallel to the direction of travel of the lawn mower, in which the cutting unit is supported by a single ground-engaging member, which member is disposed rearwardly of the bottom cutting blade, and by the connection between the cutting unit and the frame, which connection comprises a pair of laterally spaced rigid connecting members pivotally connected to the cutting unit and to the frame, and a third rigid connecting member vertically spaced from the pair of rigid connecting members and pivotally connected to the cutting unit and to the frame, the connection allowing the cutting unit to move relatively to the frame bodily upwards and downwards as well as to tilt relatively to the frame about any axis parallel to the direction of travel of the lawn mower.

2. A lawn mower as claimed in claim 1, in which the pair of laterally spaced rigid connecting members are symmetrically disposed with respect to the cutting unit.

3. A lawn mower as claimed in claim 2, in which the third connecting member is connected to the cutting unit and the frame at points in or near the vertical plane containing the longitudinal axis of the cutting unit.

4. A lawn-mower as claimed in claim 1, in which each connecting member is pivotally connected to the cutting unit at a point in or near the vertical plane containing the axis of the cutting cylinder.

5. A lawn mower as claimed in claim 1, in which the third connecting member is disposed at a level above that of the pair of connecting members.

6. A lawn mower as claimed in claim 5, in which the third connecting member extends rearwardly from the cutting unit to the frame, whilst the pair of connecting members extend forwardly from the cutting unit to the frame.

7. A lawn mower as claimed in claim 5, in which each of the connecting members extends forwardly from the cutting unit to the frame.

8. A lawn mower as claimed in claim 5, in which each of the connecting members extends rearwardly from the cutting unit to the frame.

9. A lawn mower as claimed in claim 8, in which the vertical separation between the points of pivotal connection to the frame of the third connecting member and the pair of connecting members is greater than the vertical separation between the points of pivotal connection to the cutting unit of the third connecting member and the pair of connecting members.

10. A lawn mower as claimed in claim 1, in which the third connecting member is disposed at a level below the pair of connecting members and extends forwardly from the cutting unit to the frame.

11. A lawn mower as claimed in claim 1, in which the lower connecting member or pair of connecting members is connected to the frame by a bush bearing so that the or each connecting member is constrained to move in a vertical plane.

12. A lawn mower as claimed in claim 11, in which the connecting members are otherwise connected to the frame and cutting unit by ball and socket joints.

13. A lawn mower as claimed in claim 1, in which a plurality of similar cutting units are connected to a single frame, each cutting unit being disposed in one of two longitudinally spaced locations on the frame, the or each cutting unit in the forwardmost location being laterally staggered with respect to the or each cutting unit in the rearmost location.

14. A lawn mower as claimed in claim 13, in which the frame comprises a main frame part, supported on the said forward and rear ground-engaging members, and forward and rear sub-frames each pivotally connected to the main frame part about a transversely disposed horizontal axis and each having a further ground-engaging member forwards of the said axis, each cutting unit being connected to one of the sub-frames and positioned between the ground-engaging member of the sub-frame and the axis of pivotal connection of the sub-frame to the main frame part.

15. A lawn mower as claimed in claim 1, in which each connecting member is adjustable in length.

16. A lawn mower as claimed in claim 1, in which each connecting member is a tie-rod.

17. A lawn mower as claimed in claim 1, in which the ground-engaging member of the or each cutting unit is so mounted that its position relative to the cutting unit is adjustable thereby to vary the height of cut of the cutting unit.

18. A lawn mower as claimed in claim 1, in which the ground-engaging member of the or each cutting unit is a roller.

19. A lawn mower as claimed in claim 1, in which there is a driving connection between a motor mounted on the frame and one end of the cutting cylinder of the or each cutting unit, and the or each cutting unit has counter-balancing means to compensate for the imbalance of the cutting unit due to the driving connection to the cutting cylinder.

References Cited

UNITED STATES PATENTS

| | | | |
|---|---|---|---|
| 2,972,218 | 2/1961 | Benson | 56—15.3 |
| 1,994,929 | 3/1935 | Stegman | 56—7 |
| 3,511,034 | 5/1970 | Strasel | 56—7 |

ANTONIO F. GUIDA, Primary Examiner

U.S. Cl. X.R.

56—15.3

UNITED STATES PATENT OFFICE
CERTIFICATE OF CORRECTION

Patent No. 3,624,988                    Dated December 7, 1971

Inventor(s)  Edward John Aldred

It is certified that error appears in the above-identified patent and that said Letters Patent are hereby corrected as shown below:

Column 2 line 39 (Spec. page 5 line 9)
Insert "rear" before --sub-frame--

Column 4 line 45 (Spec. page 9 line 22)
"rar" should read --rear--

Column 8 lines 28, 29, & 30: Claim 1
"supported by a single ground-engaging member, which member is" should read --supported solely by ground-engaging means--
(Supplemental Admendment- filed July 23, 1971)

Signed and sealed this 23rd day of May 1972.

(SEAL)
Attest:

EDWARD M.FLETCHER,JR.          ROBERT GOTTSCHALK
Attesting Officer              Commissioner of Patents